United States Patent [19]

Hauff

[11] 4,226,498
[45] Oct. 7, 1980

[54] WATERTIGHT WALL FEEDTHROUGH FOR ELECTRICAL GROUND

[76] Inventor: Werner Hauff, In den Stegwiesen 18, 7922 Herbrechtingen, Fed. Rep. of Germany

[21] Appl. No.: 886,822

[22] Filed: Mar. 15, 1978

[30] Foreign Application Priority Data

Apr. 16, 1977 [DE] Fed. Rep. of Germany ....... 7711895
Jun. 14, 1977 [DE] Fed. Rep. of Germany ....... 2726672

[51] Int. Cl.³ .......................................... H01R 13/52
[52] U.S. Cl. ................................ 339/205; 339/29 R; 339/94 A; 339/263 R; 52/221
[58] Field of Search ..................... 339/28, 29 R, 94 A, 339/263, 205; 52/220, 221

[56] References Cited

U.S. PATENT DOCUMENTS

| 3,400,247 | 9/1968 | Deacon | 52/221 |
| 3,850,501 | 11/1974 | Butterfield et al. | 339/94 A |
| 3,960,427 | 6/1976 | Praget et al. | 339/263 R |

FOREIGN PATENT DOCUMENTS

| 1235687 | 3/1967 | Fed. Rep. of Germany | 52/221 |
| 1518847 | 2/1968 | France | 339/263 R |
| 389711 | 7/1965 | Switzerland | 339/263 R |
| 1028208 | 5/1966 | United Kingdom | 339/205 |

Primary Examiner—Joseph H. McGlynn
Attorney, Agent, or Firm—Karl F. Ross

[57] ABSTRACT

An electrical wall feedthrough fitting is cast directly in a concrete wall and comprises an electrically conducting elongated member each of whose ends is formed with an outwardly open blind bore. An electrically insulating sleeve surrounds all but the ends of this member to prevent contact of the conductive member with the reinforcement in the wall. A terminal screw can be fitted into each of the bores for forming a good electrical connection. The middle part of a conducting member may be constituted as a flexible cable to allow the distance between the two ends to be varied or to allow the two ends to be offset relative to each other. A seal at each of the ends may be compressed to further increase the watertightness of the seal around such a fitting.

10 Claims, 6 Drawing Figures

FIG. 2
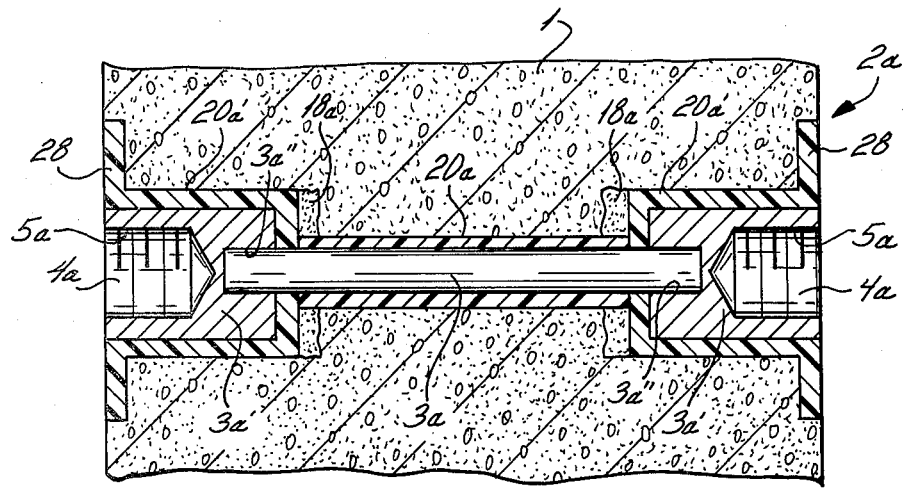
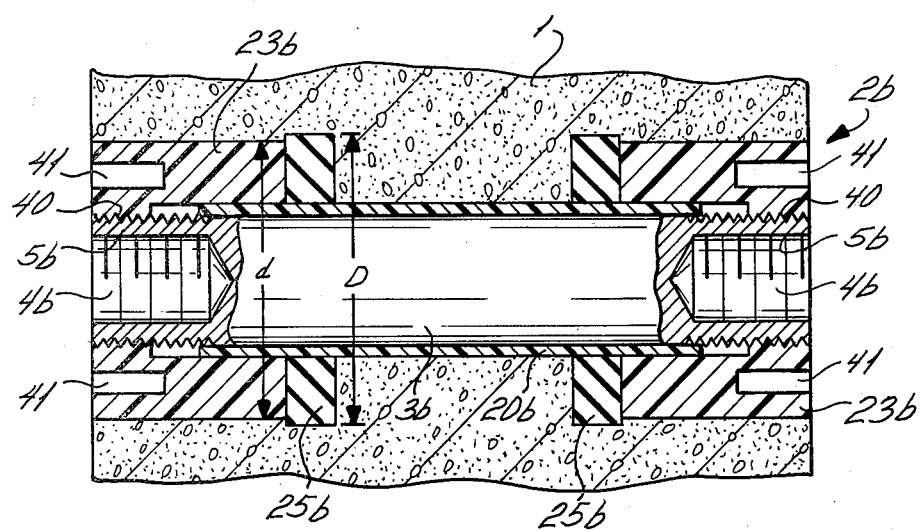
FIG. 3

WATERTIGHT WALL FEEDTHROUGH FOR ELECTRICAL GROUND

FIELD OF THE INVENTION

The present invention relates to an electrical wall feedthrough. More particularly this invention concerns such a feedthrough for connection of an electrical ground through a concrete wall.

BACKGROUND OF THE INVENTION

In many types of structures, in particular buildings having electrical equipment, power stations, transformer stations, and switching stations, it is necessary that a heavy ground conductor pass through a wall of the building. Outside of the building this ground conductor is connected to a heavy-duty ground and inside the building it is connected to the ground of the equipment. Normally such a ground conductor passes through the wall of the building very close to or beneath the ground level.

In most situations the wall is simply formed with the throughgoing hole or one is later broken through it. The ground conductor is passed through this hole, and thereafter the hole is sealed up by means of concrete, special putties, or the like.

Such a procedure has the considerable difficulty that the hole thus made, no matter how carefully it is sealed at the beginning, eventually leaks water. Thus in time water will be able to reenter the building through the hole which is normally adjacent critical electrical equipment.

Furthermore the formation of such a hole and the subsequent sealing of it represents a considerable labor expense and often requires quite some halt in the casting operation during provision of such a ground passing through the wall. Thus the known system is associated with a relatively high labor and installation cost.

Finally the known system has a considerable disadvantage that the ground conductor passing through the wall occasionally contacts the steel reinforcement of the wall. In this manner a so-called false ground is created which can often lie several volts off the real ground. Subsequent determination of real ground potential in a system thus falsely grounded is therefore impossible.

OBJECTS OF THE INVENTION

It is therefore an object of the present invention to provide an improved wall feedthrough fitting.

Another object is to provide such a fitting which can be installed very easily and even by relatively unskilled personnel.

A further object is to provide a wall feedthrough fitting and method of constructing which overcomes the above-given disadvantages.

SUMMARY OF THE INVENTION

These objects are attained according to the present invention in a wall feedthrough fitting basically comprising an electrically conducting elongated element which is embeddable in a wall and has a pair of ends each lying when the member is embedded in the wall at a respective side of the wall. Each of these ends has a respective outwardly open blind bore in each of which is receivable a respective terminal screw. An electrically insulating sleeve surrounds all but the ends of this electrically conducting member.

The fitting according to the instant invention is cast integrally into the wall through which it is to extend. It has an overall length equal to the wall thickness so that one of the blind bores will be exposed at each face of the wall. Lock nuts can secure the terminal screws tightly in place. The conducting member according to this invention is substantially solid between its ends so that no fluid can flow through this fitting through the wall, and since the fitting is cast integrally into the wall no fluid can flow around it through the wall.

In order to accommodate walls of varying thicknesses according to this invention the conducting member can be constituted as a pair of end pieces each formed at the respective one of the bores and a deformable or flexible intermediate piece interconnecting these end pieces. A piece of heavy-duty insulated electrical cable may constitute this deformable intermediate piece and has its ends soldered or brazed to the end pieces which may be constituted as small conductive metal blocks each formed with the respective threaded blind bore. In relatively thick walls the cable will extend substantially straightly between the two end parts, which may be in line or offset from each other, and in a relatively thin wall the cable will be bent considerably so that the two end parts can lie relatively close to each other.

Such a member may be fitted between two concrete wall forms according to this invention simply by fitting over each of the end parts a temporary connecting plate which is held in place by a threaded plug or screw engaged in the respective blind bore, and nailing or otherwise securing this plate to the inside of the form. It is also possible merely to use the inherent springiness of the intermediate part of the conducting member to press the two end parts against the corresponding inner faces of the wall forms.

The insulating sleeve according to this invention may simply be sprayed or extruded directly onto the conducting member. When a piece of insulated cable forms the intermediate part of the conducting member, the insulation thereof itself constitutes the intermediate portion of the insulating sleeve. Separate insulating caps that are glued or welded to the insulation of the cable cover all but the outer face of each of the end parts. This insulating sleeve may also be covered with a hardfoam layer that is sprayed on, and which adheres readily both to the material of the insulating member and to concrete. Even after curing and drying of the concrete forming the wall a good seal will remain.

In situations where extreme care must be taken to ensure good watertightness over a long period of time, as for instance in installations wherein the feedthrough will be below the water table, the instant invention provides a further arrangement whereby the sealing properties can be greatly increased. To this end each of the above-described end pieces is formed of a pair of relatively shiftable parts between which is provided an outwardly deformable seal ring. Once the device is cast in place the parts are shifted relative to each other to expand the seal ring outwardly and are left in this relatively shifted position. Thus each end piece may be constituted as an inner part formed with an outwardly directed flange and an outer part shiftable relative to this inner part and having an end juxtaposable with the flange. The seal is engaged between this end surface and the flange and the outer part is tapered toward the outer surface of the wall so that when it is pressed inwardly it compresses this seal and forces it radially outwardly into excellent contact with the concrete surrounding it. The outer part may have an outer end that normally in an uncompressed condition of the seal lies slightly further out than the corresponding outer face of the inner part. Thus when the terminal screw is threaded into the inner part and a lock nut with a washer is screwed down over it the outer part will be forced in to axially compress and radially deform the seal. Another arrangement of this type merely provides an outer part which compresses a seal against the concrete itself.

With the fitting according to the instant invention it is therefore possible to provide a wall feedthrough at any location on a wall to be cast, merely by positioning the fitting between the forms before casting the walls. Since the conducting member of this fitting is insulated inside the wall accidental contact with conductive material inside the wall, such as the reinforcing bars thereof, will not produce a false ground. After the wall is cast the forms can be withdrawn without paying any particular attention to the feedthrough fitting to which can subsequently be secured the screw terminals. It is also possible to bolt relatively heavy connectors to this feedthrough fitting, as the integral casting thereof in the wall makes it very stable. In fact it is possible to hang equipment from such a feedthrough fitting if desired, unlike the prior-art systems wherein the patching mortar fitted in around such a feedthrough normally is not as strong as the rest of the wall.

BRIEF DESCRIPTION OF THE DRAWING

FIGS. 2 and 3 are sections similar to FIG. 1 of two further fittings in accordance with this invention;

SPECIFIC DESCRIPTION

Figure 1:
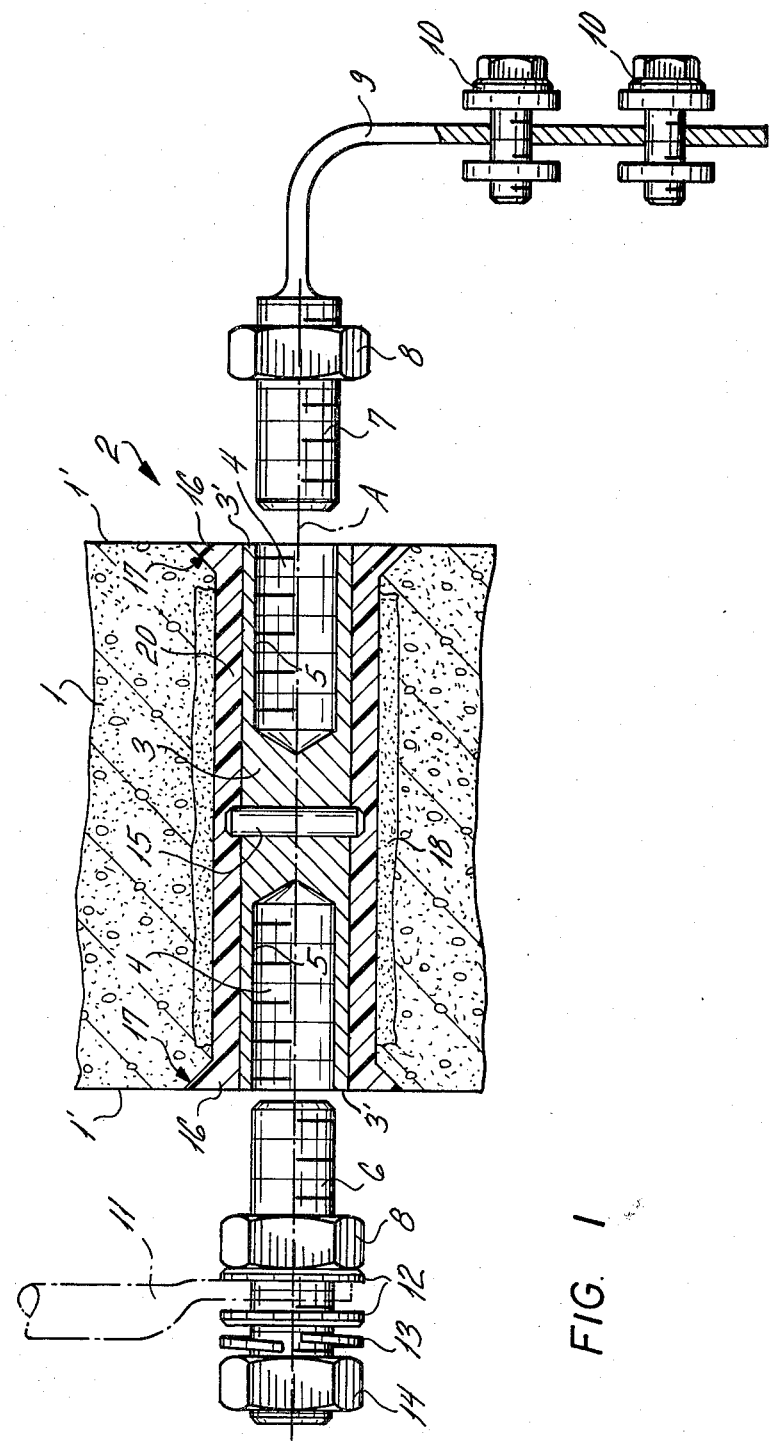
FIG. 1 is a vertical section through a feedthrough fitting according to the instant invention.

As shown in FIG. 1 a concrete wall 1 having a pair of vertical parallel faces 1' is traversed by a feedthrough fitting shown generically at 2 and basically comprising a cylindrical conducting metal bar 3 centered on an axis A and formed at each of its ends with a blind bore 4 having a screwthread 5. An insulating sleeve 20 closely surrounds this bar or member 3 and leaves only the outer ends 3' thereof exposed at the faces 1' of the wall 1.

The bore 4 on one side of the wall 1 receives a threaded terminal screw 6 and the other bore 4 receives a similar threaded terminal screw 7. Lock nuts 8 on these screws 6 and 7 allow them to be tightly secured to the member 3 once they are screwed therein. The outer screw 7 is unitarily formed with a ground bar 9 having a pair of terminals 10 that are normally connected to a heavy cable that in turn is connected to a bar driven into the ground or to another suitable heavy-duty ground. An eye 11 at the end of a ground cable fits over the inner screw 8 between a pair of washers 12 and is held in place via another nut 14 and a lock nut 13.

The sleeve 20, which is molded directly onto the member 3, is held in place with a transverse pin 15 extending perpendicular to the axis A and projecting radially slightly to each side of the member 3. At each of its ends the sleeve 20 has a flange 16 with a frustoconical inner face 17. In addition molded in place over this sleeve 20 is a sleeve-like layer or hard-foam material 18 that bonds readily to the concrete of the wall 1 and to the synthetic resin of the sleeve 20.

Before casting of the wall 1 the fitting 2—complete with the member 3, pin 15, sleeve 20, and sleeve 18 but without the screw 6 or 7—is fitted between the forms for the wall with each outer end face 3' of the member 3 snugly engaging a respective inner face of the form. The wall is then cast in place. Once the concrete has cured the forms are removed and the screws 6 and 7 can be inserted and locked in place with their locknuts 8. The fitting 2 forms a virtually unitary part with the wall so that leakage around it is impossible. Furthermore intermediate the bores 4 the member 3 is solid so that leakage through it is also impossible.

In the arrangement of FIG. 2 the fitting 2a is fitted in a wall 1 but here is set up so that it can be used for walls of different thicknesses. This fitting 2a has a conductive member formed by a middle piece constituted as the cable conductor 3a and a pair of end pieces 3a' welded to the cable conductor 3a and themselves having bores 4a with screwthreads 5a. Each end part 3a' is formed as a short cylindrical block of electrically conductive metal and has at its rear or inner end a cylindrical recess 3a'' in which is soldered or brazed the respective end of the conductor 3a.

The insulating sleeve here is formed by the insulation 20a surrounding the conductor 3a between the end pieces 3a' and synthetic-resin caps 20a' surrounding each of the end pieces 3a'. Each end piece 3a' and the corresponding cap 20a' may be of polygonal section so that they are not relatively rotatable, or the caps 20a' may merely fit very tightly and snugly around the end pieces 3a' so that when a screw or the like is threaded into the respective bore 4a this part 3a' will not twist in the concrete of the wall 1.

Each of the caps 20a' is furthermore provided at the respective face 1' of the wall 1 with an outwardly extending flange 28 which may be secured by nails or bolts to the wall 1. This flange 28 may also be loosely secured to the interior of a form used to cast the wall 1 for positioning of the fitting 2a before and during casting. At its inner end each of these caps 20a' also has a disk or layer 18a of hard foam which once again ensures good adherence between the wall 1 and the fitting 2a.

In the fitting 2a of FIG. 2 the middle conductor part 3a and middle insulating part 20a are in reality only a short length of heavy-duty electrical cable, preferably of the solid-conductor type. Thus this intermediate portion can if desired be bent to fit this arrangement to a wall 1 of thickness less than that shown in FIG. 2.

FIG. 3 shows a fitting 2b mounted in a wall 1 and basically comprising an inner rod-like conducting member 3b each of whose outer ends is formed with a respective blind bore 4b having a screwthread 5b. The outside of each of the ends of the conducting member 3b has a screwthread 40 and intermediate these screwthreads 40 the member 3b is covered with an insulating sleeve 20b.

Threaded over each of the outer ends of the rigid bar or bolt 3b is a ring or nut 23b of insulating material formed with diametrically opposite axially opening holes 41 for receiving a key or wrench. The rear end of each of these nuts 23b bears on an elastomeric seal ring or washer 25b whose opposite face bears directly on the concrete of the wall 1. Each nut 23b is substantially cylindrical and has a diameter d which is slightly smaller than the diameter D of the respective seal 25b.

After curing of the wall 1 around the fitting 2b a wrench is fitted into the recesses 41 of each of the nuts 25b and each of these nuts 25b is then screwed-in somewhat on the member 3b against the respective seal 25b. This action compresses the seals 25b axially and forces them radially into very tight contact with the concrete of the wall 1 to ensure a long-lasting and very tight seal around the fitting 2b.

Figure 4:
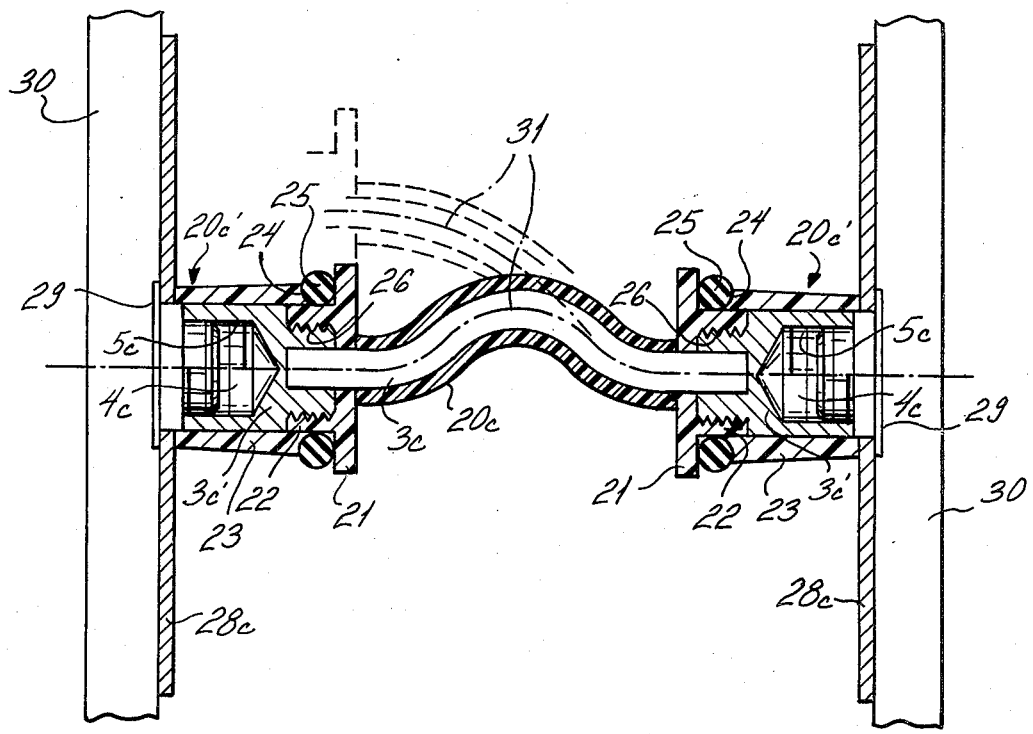
FIGS. 4 and 5 are further vertical sections through yet another fitting according to this invention showing it before and after casting of the wall, respectively
Figure 5:
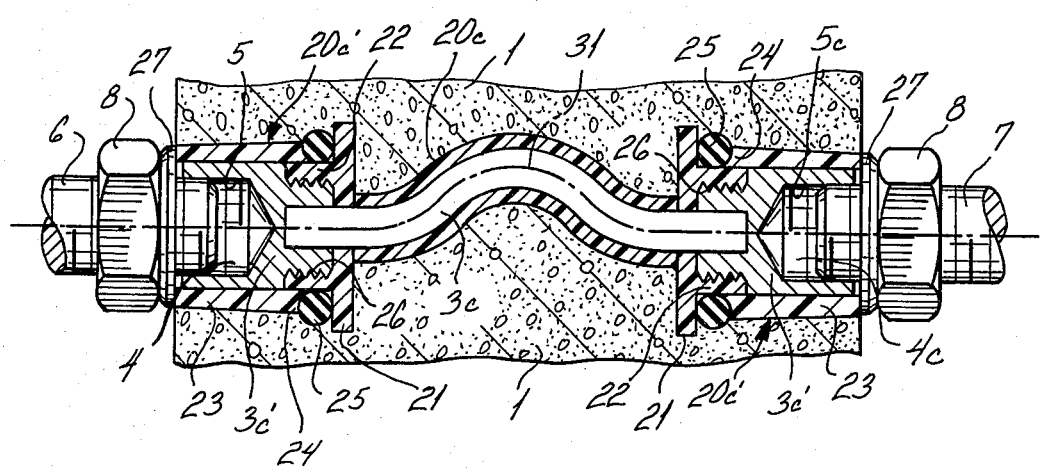

FIGS. 4 and 5 show the mounting of another fitting 2c in a wall 1. In this arrangement the fitting 2c basically comprises a conductive member formed by a flexible middle conductive piece and a pair of end pieces 20c' also of conductive material and each having a blind bore 4c formed with threads 5c. The insulating sleeve is formed by the insulation 20c of the middle part 3c, and by insulation 20c' over each of the end pieces 3c'. Each of the insulations 20c' of each end piece 3c' is constituted in turn by a cap 22 secured at a screwthread 26 to the respective piece 3c' and glued unitarily to the insulation sleeve 20c and by another sleeve 23 slidable on the respective end piece 3c'. Each cap 22 has a flange 21 that axially confronts an end surface 24 of the respective sleeve 23, and an elastomeric O-ring 25 is provided between each of these surfaces 24 and the respective flange 21. The outer surface of each of the sleeves 23 tapers away from the respective cap 22 toward the outer surface of the wall.

Figure 6:
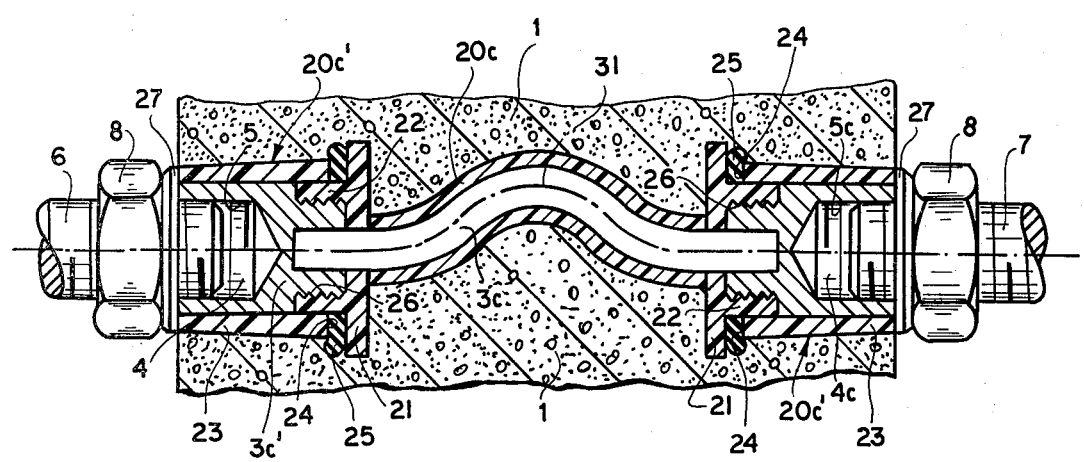
FIG. 6 is a view similar to FIG. 5, but showing the fitting after installation and tightening.

For installation of the unit 2c in a wall temporary plates 28c are secured by means of synthetic-resin plug/screws 29 to each of the end parts 3c'. Each of these plug/screws has a shoulder so that the end face of the respective sleeve 23 can project somewhat beyond the end face of the part 3c'. These plates 28c are then nailed or otherwise temporarily secured to the insides of the forms 30. Line 31 shows how the one end part 3c' does not need to be in line with the other end part 3c', the part can be offset therefrom. After casting of the wall the forms 30 and plugs 29 are removed, along with the plates 28c. Tensioning washers 27 are then fitted over the studs or connector screws 6 and 7 which are then screwed tightly in place with their locknuts 8 pressed tightly against these washers or tensioning disks 27 as seen in FIG. 6. This action pushes the sleeves 23 inwardly relative to the parts 3c' and thereby compresses the seals 25 between the end surfaces 24 and flanges 21. Axial compression of these seals 25 forces them radially outwardly into extremely tight contact with the surrounding concrete so as to produce a very watertight seal. In this arrangement it is even possible at a later date by retightening the nuts 8 to further tighten the seal if desired.

The system according to the instant invention therefore allows a feedthrough to be provided in a wall in a very simple manner. A single type of feedthrough can be adapted to walls of different thicknesses and at all times a very watertight seal will be provided. The fitting can be used horizontally or vertically, and the two ends can be offset to each other horizontally or vertically. As the conducting member is always insulated inside the wall, contact of this conducting member with the steel reinforcement of the wall will not create a false ground.

I claim:

1. An electrical feedthrough fitting and grounding assembly comprising:
   a cast wall having a pair of faces;
   respective electrically conductive end pieces embedded in said cast wall and having ends lying at said faces, each end having an outwardly open blind bore exposed at the respective face;
   a deformable and electrically conductive middle piece extending between and electrically interconnecting said end pieces;
   an electrically insulating sleeve having a middle sleeve part surrounding said middle piece and a pair of end sleeve parts respectively surrounding said end pieces except at said ends thereof; and
   respective terminal screws threaded into said bores.

2. The assembly defined in claim 1, further comprising a positioning plate releasably secured to each of said ends and securable to a concrete wall form.

3. The assembly defined in claim 1 wherein said middle piece is substantially solid, said sleeve being hermetically engaged around said middle piece, and said sleeve being hermetically engaged with said wall, whereby liquid leakage through said wall at said assembly is substantially impossible.

4. The assembly defined in claim 3, further comprising a lock nut threaded over one of said screws and bearing longitudinally on the respective end of said member.

5. The assembly defined in claim 3 wherein said middle piece is a length of insulated electrical cable soldered to said end pieces.

6. The assembly defined in claim 5 wherein said insulating sleeve is constituted by the insulation of said cable and insulating caps on said end pieces.

7. The assembly defined in claim 3 wherein said sleeve has at one end of said end pieces two parts and is provided between said parts with an outwardly deformable seal.

8. The assembly defined in claim 7 wherein said two parts are relatively displaceable to clamp and deform said seal, one of said parts lying substantially outside the other and having an outwardly tapered outer surface.

9. The assembly defined in claim 8 wherein the other part is formed with an outwardly extending flange forming with the inner end of said one part an outwardly open groove receiving said seal.

10. The assembly defined in claim 9 wherein said one part has an outer end face which in an uncompressed condition of said seal extends outwardly beyond the respective end piece, said fitting further comprising a tensioning washer engageable with said outer end face and pressable thereagainst to compress said seal.

* * * * *